(12) United States Patent
Strickland

(10) Patent No.: US 7,281,150 B1
(45) Date of Patent: Oct. 9, 2007

(54) METHODS AND APPARATUS FOR CONTROLLING OPERATION OF A DATA STORAGE SYSTEM

(75) Inventor: Stephen Strickland, Marlboro, MA (US)

(73) Assignee: EMC Corporation, Hopkinton, MA (US)

( * ) Notice: Subject to any disclaimer, the term of this patent is extended or adjusted under 35 U.S.C. 154(b) by 383 days.

(21) Appl. No.: 10/810,431

(22) Filed: Mar. 26, 2004

(51) Int. Cl.
*G06F 1/00* (2006.01)

(52) U.S. Cl. ............... 713/330; 713/300; 713/310; 713/340; 327/142; 327/143; 327/198

(58) Field of Classification Search ........ 713/300–601; 327/142, 143, 198
See application file for complete search history.

(56) References Cited

U.S. PATENT DOCUMENTS

| | | | |
|---|---|---|---|
| 5,339,446 A * | 8/1994 | Yamasaki et al. ........... | 713/340 |
| 6,237,103 B1 * | 5/2001 | Lam et al. ................... | 713/330 |
| 6,333,650 B1 * | 12/2001 | Amin et al. ................ | 327/143 |
| 6,429,706 B1 * | 8/2002 | Amin et al. ................ | 327/143 |
| 6,601,176 B1 * | 7/2003 | Alexander et al. .......... | 713/300 |
| 6,633,905 B1 | 10/2003 | Anderson et al. ........... | 709/219 |
| 6,678,639 B2 | 1/2004 | Little et al. ................. | 702/188 |
| 6,681,282 B1 | 1/2004 | Golden et al. .............. | 710/302 |
| 6,735,706 B2 * | 5/2004 | Tomlinson et al. ......... | 713/300 |
| 6,792,553 B2 * | 9/2004 | Mar et al. ................... | 713/330 |
| 6,850,048 B2 * | 2/2005 | Orr et al. .................... | 323/299 |
| 6,873,268 B2 | 3/2005 | Lebel et al. ........... | 340/870.16 |
| 6,879,139 B2 * | 4/2005 | Brown et al. ............... | 323/299 |
| 6,901,572 B1 * | 5/2005 | Dougherty et al. .......... | 716/17 |
| 6,924,986 B1 | 8/2005 | Sardella et al. ............. | 361/785 |
| 7,039,737 B1 | 5/2006 | Dorr et al. .................. | 710/240 |
| 7,080,264 B2 * | 7/2006 | Mahony et al. ............. | 713/300 |
| 7,080,273 B2 * | 7/2006 | Brown et al. ............... | 713/330 |
| 7,100,058 B1 * | 8/2006 | Tomlinson et al. ......... | 713/300 |
| 7,111,183 B1 * | 9/2006 | Klein et al. ................. | 713/330 |
| 2005/0135069 A1 | 6/2005 | King et al. ................. | 361/727 |
| 2005/0223284 A1 | 10/2005 | Strickland et al. ........... | 714/23 |

* cited by examiner

*Primary Examiner*—Rehana Perveen
*Assistant Examiner*—James F. Sugent
(74) *Attorney, Agent, or Firm*—BainwoodHuang

(57) ABSTRACT

A data storage system includes power circuitry configured to provide power signals, storage processing circuitry configured to perform data storage operations, and a packaged microcontroller coupled to the power circuitry and the storage processing circuitry. The packaged microcontroller has input lines, output lines, and control circuitry coupled to the input lines and the output lines. The control circuitry is configured to (i) receive, on the input lines, first power signals (e.g., voltage signals for I/O circuitry) which is provided by the power circuitry to the storage processing circuitry, (ii) wait a predetermined time period in response to receipt of the first power signals on the input lines, and (iii) output, through the output lines, enable signals to the power circuitry after waiting the predetermined time period. The enable signals directs the power circuitry to provide second power signals to the storage processing circuitry (e.g., voltage signals for core circuitry).

19 Claims, 5 Drawing Sheets

METHODS AND APPARATUS FOR CONTROLLING OPERATION OF A DATA STORAGE SYSTEM

BACKGROUND

A data storage system stores and retrieves information on behalf of one or more external host computers. A typical data storage system includes power supply circuitry, a storage processor, and a set of disk drives. The power supply circuitry provides power to the storage processor thus enabling the storage processor to load data into and retrieve data from the set of disk drives on behalf of the external host computers.

It is common for the electronic devices (e.g., integrated circuit components) forming the storage processor to require different voltages from the power supply circuitry, and for such devices to require the different voltages in a particular order when powering up in order to avoid damage. For example, suppose that the electronic devices for a particular storage processor use a 3.3 VDC signal for powering the input/output (I/O) circuitry and a 2.5 VDC signal for powering the core circuitry. In such a situation, the power supply circuitry may need to provide the 3.3 VDC signal first followed by the 2.5 VDC signal a short time later. Otherwise, the I/O circuitry will attempt to obtain power from the core circuitry and damage the core circuitry in the process.

One conventional data storage system, which is configured to power up in the manner described above, uses power supply circuitry having a power sequencing circuit consisting of discrete components. The discrete components operate to stagger delivery of the different voltages to the electronic devices of the storage processor (e.g., voltage dividers formed by discrete resistors, control circuits formed by discrete logic, timing circuits formed by individual resistors and comparators, etc.). Accordingly, the discrete components work to ensure that the I/O circuitry of electronic devices powers up before the core circuitry of the electronic devices thus preventing damage to the electronic devices.

SUMMARY

Unfortunately, there are deficiencies to the above-described conventional data storage system which includes a power sequencing circuit consisting of discrete components. For example, the use of discrete components in the power sequencing circuit is typically expensive due to the additive cost of each component. Additionally, such use often hinders circuit board designs due to a relatively large amount of circuit board real estate that is consumed by such components. Furthermore, such use of discrete components is a strict hardware implementation of the power sequencing operation thus making the power sequencing process inflexible and expensive to change, i.e., difficult to debug or upgrade.

In contrast to the above-described conventional data storage system which uses a power sequencing circuit consistently formed of discrete components, embodiments of the invention are directed to techniques for controlling a data storage system having (i) power circuitry for providing power signals and (ii) storage processing circuitry for performing data storage operations, using a packaged microcontroller to control power sequencing. Such use enables power sequencing at a relatively low cost (e.g., less components) and uses a relatively small amount of circuit board real estate (e.g., the footprint of the packaged microcontroller). Additionally, such use provides flexibility in that a manufacturer is capable of easily modifying an initial power up sequence by providing new code to the packaged microcontroller. Furthermore, the manufacturer is capable of programming the microcontroller with more robust operations, e.g., automatic upgrading of boot code, utilization of interrupts to respond to particular events, coordination of multiple storage processors, etc.

One embodiment of the invention is directed to a data storage system which includes power circuitry configured to provide power signals, storage processing circuitry configured to perform data storage operations, and a packaged microcontroller coupled to the power circuitry and the storage processing circuitry. The packaged microcontroller has a set of input lines, a set of output lines, and control circuitry coupled to the set of input lines and the set of output lines. The control circuitry is configured to (i) receive, on the set of input lines, a first set of power signals (e.g., voltage signals for I/O circuitry) which is provided by the power circuitry to the storage processing circuitry, (ii) wait a predetermined time period in response to receipt of the first set of power signals on the set of input lines, and (iii) output, through the set of output lines, a set of enable signals to the power circuitry after waiting the predetermined time period. The set of enable signals directs the power circuitry to provide a second set of power signals to the storage processing circuitry (e.g., voltage signals for core circuitry). Such an embodiment provides a low cost solution requiring relatively little circuit board space, and delivers flexibility for robust and reliable operation.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Embodiments of the invention are directed to techniques for controlling a data storage system having (i) a power subsystem for providing power signals and (ii) storage processing circuitry for performing data storage operations, utilizing a packaged microcontroller to control power sequencing. Such use provides power sequencing at a relatively low cost (e.g., less components) and uses a relatively small amount of circuit board real estate (e.g., the footprint of the packaged microcontroller). Furthermore, such use offers flexibility in that a manufacturer of the data storage system is capable of easily modifying an initial power up sequence by providing new code to the packaged microcontroller. Moreover, the manufacturer is capable of programming the microcontroller with more robust operations, e.g., automatic upgrading of boot code, utilization of interrupts to respond to particular events, coordination of multiple storage processors, etc.

Figure 1:
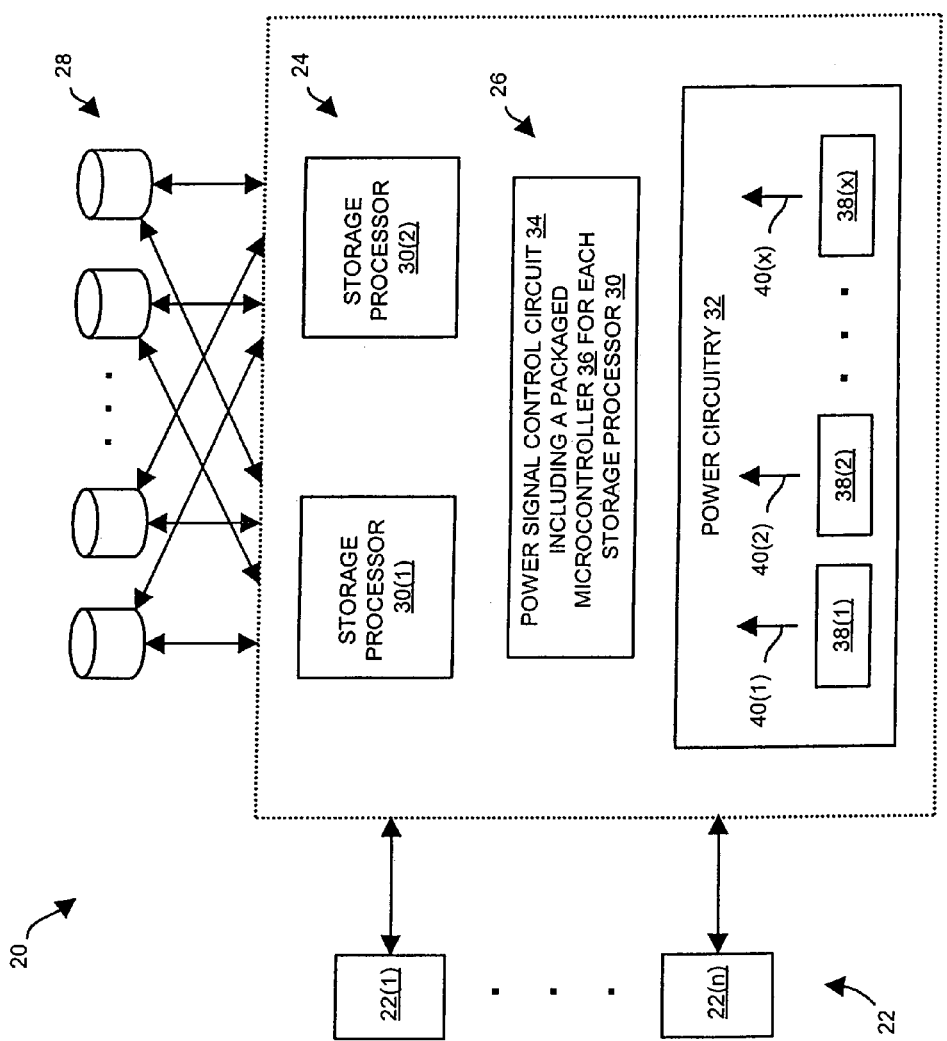
FIG. 1 is a block diagram of a data storage system which is suitable for use by an embodiment of the invention.

FIG. 1 shows a data storage system 20 which is suitable for use by the invention. The data storage system 20 is configured to store and retrieve information on behalf of a set of external hosts 22(1), . . . , 22(n) (collectively, hosts 22). The data storage system 20 may include one or more network interfaces (not shown for simplicity) to enable the data storage system 20 to communication with the hosts 22 using a variety of different protocols, e.g., TCP/IP communications, Fibre Channel, count-key-data (CKD) record format, block I/O, etc.

As shown in FIG. 1, the data storage system 20 includes storage processing circuitry 24, a power subsystem 26 and an array of storage devices 28 (e.g., disk drives). The storage processing circuitry 24 includes, by way of example only, two storage processors 30(1), 30(2) (collectively, storage processors 30). The power subsystem 26 includes (i) power circuitry 32 and (ii) a power signal control circuit 34 having a packaged microcontroller 36 for each storage processor 30. Since the data storage system 20 includes two storage processors 30 by way of example, the power circuitry 32 includes two packaged microcontrollers 36, one associated with each storage processor 30.

The power circuitry 32 includes a variety of power sources 38(1), 38(2), . . . 38(x) (collectively, power sources 38) which are configured to provide respective variety of power signals 40(1), 40(2), . . . , 40(x) (collectively, power signals 40) under direction of the power signal control circuit 34 (e.g., 1.25 VDC, 1.8 VDC, 2.5 VDC, 3.3 VDC, etc.). Some power signals 40 drive input/output (I/O) circuitry of the storage processing circuitry 24 (e.g., the 3.3 VDC signal). Other power signals 40 drive core circuitry of the storage processing circuitry 24 (e.g., the 2.5 VDC signal). In one arrangement, all of the power signals 40 are individually generated. In another arrangement, some of the power signals 40 are derivatives of other power signals 40 (e.g., using voltage dividing and conditioning circuitry).

During operation, the storage processors 28 are configured to individually perform data storage operations on the set of storage devices 28 on behalf of the hosts 22 (e.g., load and store operations) thus providing the hosts 22 with high availability (e.g., multiple pathways for fault tolerance, load balancing, higher throughput, etc.). In support of such operation, the packaged microcontrollers 36 of the power signal control circuit 34 control delivery of at least some of the power signals 40 from the power circuitry 32 to their respective storage processors 30 to enable robust operation as well as prevent damage to the storage processors 30.

For example, each packaged microcontroller 36 is responsible for providing its respective storage processor 30 with a proper power signal sequence when the data storage system 20 initially powers up. Along these lines, operation of the power signal control circuit 34 begins when the data storage system 20 obtains access to a main power source (e.g., when a user initially plugs an electrical cord of the data storage system 20 into a wall outlet) and continues as long as the data storage system 20 has access to the main power source. Accordingly, operation of the power signal control circuit 34 continues even during cycles of booting and shutting down (or resetting) the data storage system 20, i.e., the power signal control circuitry 34 maintains control of the power signals 40 until the main power source is cutoff such as when the user unplugs the electrical cord or when power to the wall outlet fails.

It should be understood that the packaged microcontrollers 36 direct the operation of the power signal control circuit 34. To this end, each packaged microcontroller 36 runs code stored in its non-volatile memory (e.g., internal EEPROM). Accordingly, use of the packaged microcontrollers 36 provide flexibility in that changes to their operation (e.g., modification for a bug fix, upgrades, etc.) can be made by simply replacing the codes in their memories with new codes. No hardwire changes are required as in conventional designs using discrete components. Moreover, in contrast to discrete component configurations for power sequencing, use of the packaged microcontrollers 36 is inexpensive and requires minimal circuit board space since the packaged microcontrollers 36 are essentially standard parts disposed in a relatively small packages. Further details of embodiments of the invention will now be provided with reference to FIG. 2.

Figure 2:
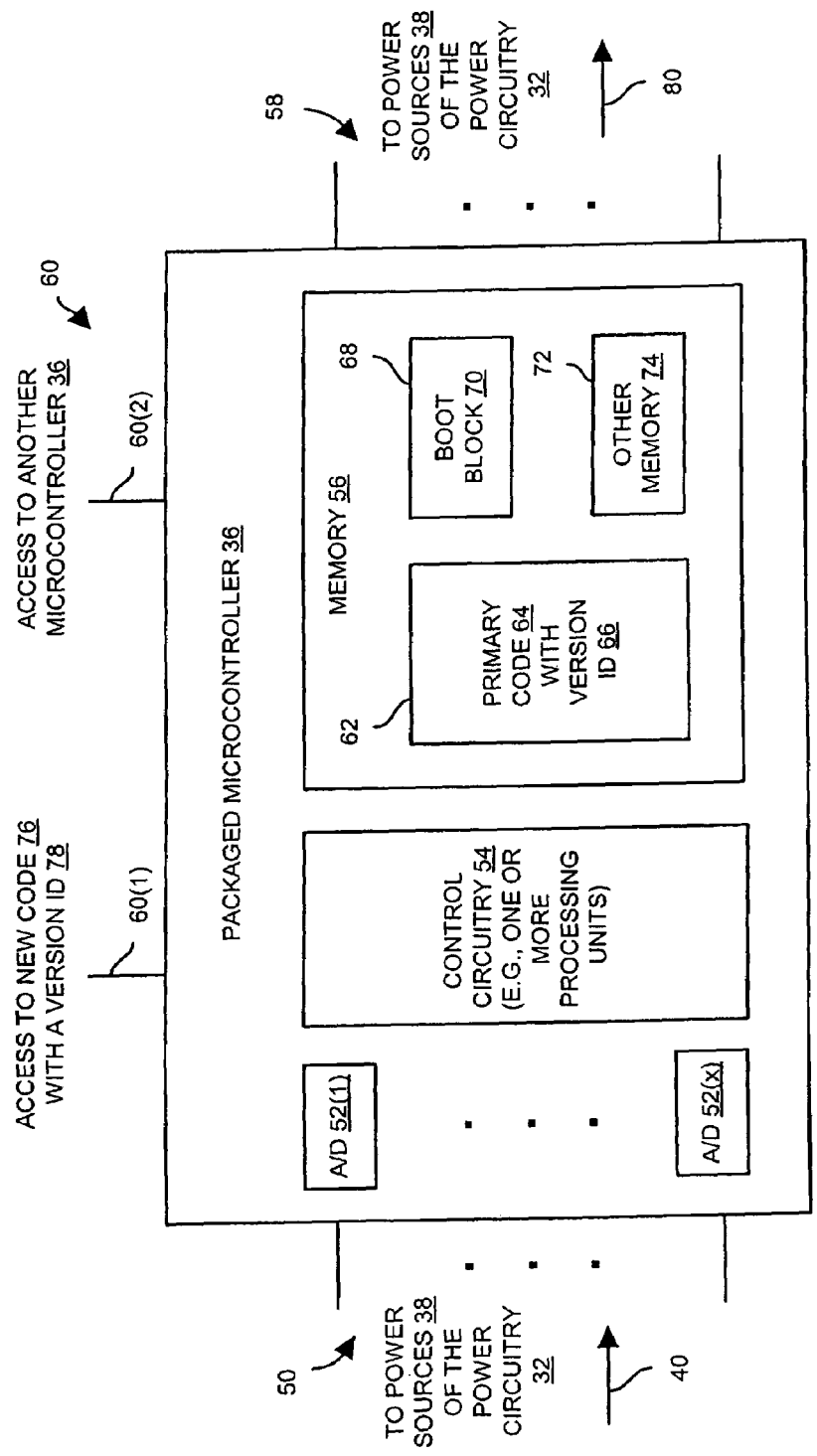
FIG. 2 is a block diagram of a packaged microcontroller of the data storage system of FIG. 1.

FIG. 2 shows particular details of each packaged microcontroller 36 of the power signal control circuit 34. As shown, the packaged microcontroller 36 includes a set of input lines 50, a set of built-in analog-to-digital (A/D) converters 52, control circuitry 54, memory 56, a set of output lines 58, and a set of data ports 60(1), 60(2) (collectively, data ports 60). The memory 56 includes a first section 62 that stores primary code 64 with a version identifier 66, a second section 68 that stores boot block code 70, and a third section 72 of other memory locations 74 for storing other information in a persistent manner (e.g., supplemental code, additional data, etc.). The control circuitry 54 (i.e., one or more processing units) has the capability to read information from the memory 56 and write information to the memory 56. The data ports 60 enable the packaged microcontroller 36 to communicate with other circuitry such as a storage processor 30, another packaged microcontroller 36 associated with another storage processor 30, etc.

It should be understood that there are many off-the-shelf microcontroller devices which are suitable for use as the packaged microcontroller 36. Many of these devices include a set of built-in A/D converters, general purpose registers, non-volatile memory (e.g., EEPROM), timers, digital circuitry blocks, analog circuitry blocks, UARTs, and other accessory circuits. Such devices require a relatively small footprint and consume less circuit board space than many conventional power sequencing circuits which are implemented using discrete components. One type of microcontroller device, which is well-suited for the packaged microcontroller 36, is the standard PIC-type microcontroller (or PICmicrocontroller) which is a relatively inexpensive but reliable and flexible controller.

When the packaged microcontroller 36 is properly installed within the data storage system 20, the input lines 50 and the output lines 58 couple to the sources 38 of the power circuitry 32. Such coupling allows the packaged microcontroller 36 with the ability to determine current voltage levels of the power signals 40, and to control the operation of the power sources 38 individually (e.g., to enable or disable providing the power signals 40 to the storage processing circuitry 24 for proper power sequencing). In particular, each packaged microcontroller 36 has the capability to enable or disable the delivery of certain power signals 40 to its respective storage processor 30.

The data port 60(1) of the packaged microcontroller 36 couples to its respective storage processor 30 (also see FIG. 1). In one arrangement, the data port 60(1) is a standard I2C bus that enables the packaged microcontroller 36 to robustly communicate with its respective storage processor 30. In particular, the packaged microcontroller 36 is capable of reading new information from its respective storage processor 30 through its data port 60(1), and overwriting information stored within the memory 56 with the new information under certain circumstances. For example, the packaged microcontroller 36 is capable of reading new code 76 with a version identifier 78 and replacing the primary code 64 with the new code 76 in an automated manner. This feature will be explained in further detail later.

Additionally, the data port 60(2) provides another communications pathway into and out of the packaged microcontroller 36. In one arrangement, the data port 60(2) provides UART peer-to-peer communication to occur between the packaged microcontroller 36 and another packaged microcontroller 36 for another storage processor 30. Further details of embodiments of the invention will now be provided with reference to FIGS. 3-5.

Figure 3:
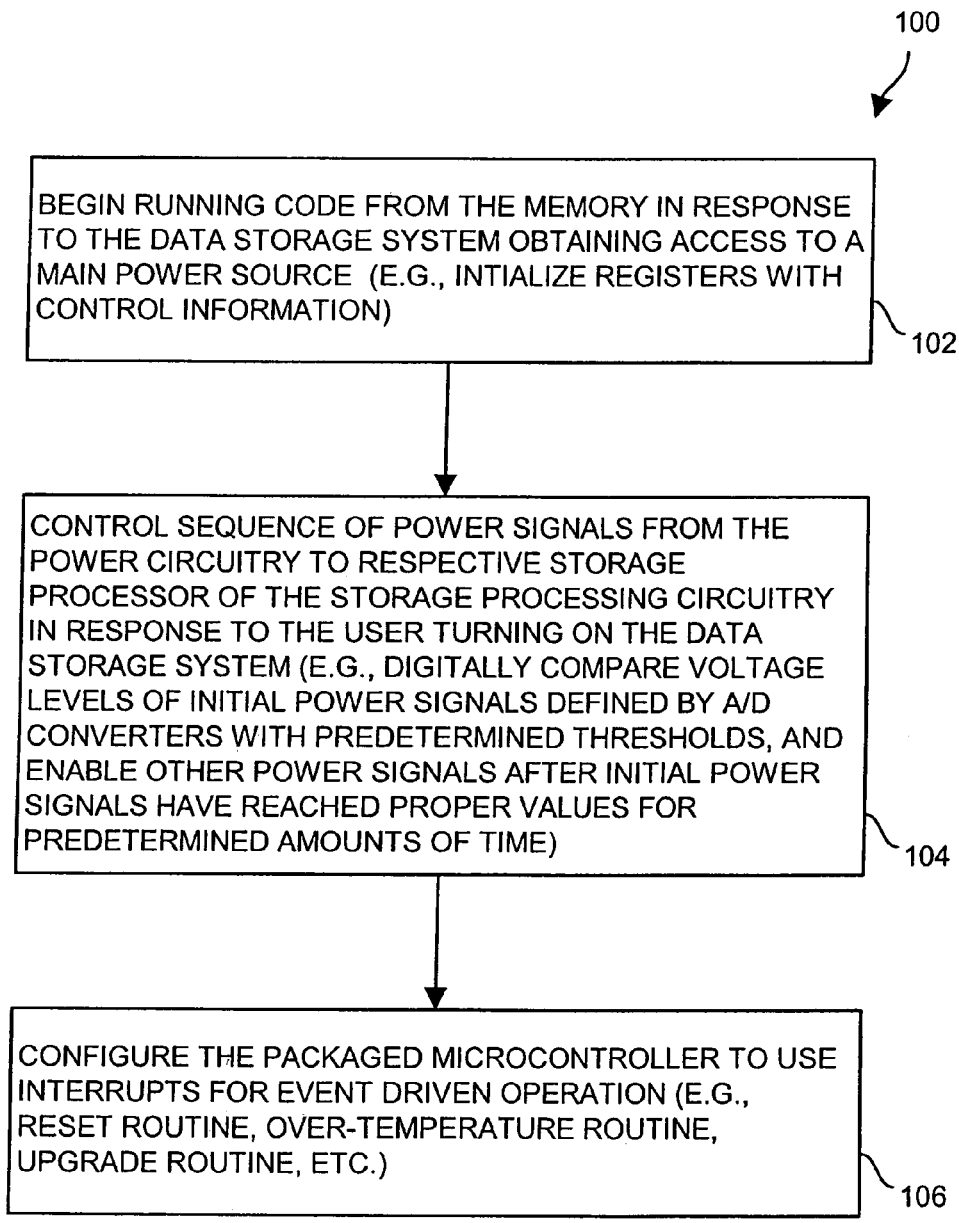
FIG. 3 is a flowchart for a series of operations which is performed by the packaged microcontroller of FIG. 2.

FIG. 3 shows a series of operations 100 which is performed by each packaged microcontroller 36 of the power signal control circuitry 34 (also see FIG. 1). The series of operations 100 occurs when the user (i) connects the data storage system 20 to the main power source (e.g., the user plugs the electrical cord of the data storage system 20 into a live wall outlet) and (ii) turns on the data storage system 20.

In step 102, the packaged microcontroller 36 detects that the user has connected the data storage system 20 to the main power source and begins running the primary code 64 which is stored in the portion 62 of its memory 56 (also see FIG. 2). As part of this process, the packaged microcontroller 36 loads control information (e.g., control bits) from the memory 56 into certain registers thus initializing itself for subsequent operations.

In step 104, the packaged microcontroller 36 responds to the user turning on the system 20 (e.g., a power button press) by controlling when certain power signals 40 are provided to its respective storage processor 30 of the storage processing circuitry 24 (FIG. 1). In particular, the A/D converters 52 of the packaged microcontroller 36 convert the voltage levels of the power signal 40 into digital values, and the control circuitry 54 of the packaged microcontroller 36 reads the digital values and compares them to predetermined thresholds which are identified by some of the control information loaded from the memory 56 in step 102. When the packaged microcontroller 36 determines that certain power signals 40 have reached proper voltage levels, the packaged microcontroller 36 then outputs control signals 80 (FIG. 2) to the power sources 38 to enable the power circuitry 38 to provide other power signals 40. For example, the control circuitry 54 waits for various power signals 40, which power the I/O buffer circuitry of the storage processors 30, to reach steady states for predetermined amounts of time (e.g., 10 milliseconds) before enabling the power circuitry 38 to provide other power signals 40 which power the core circuitry of the storage processors 30. Accordingly, the power sequencing operation of the packaged microcontroller 36 safeguards the electronic devices of the storage processors 30 by not allowing the I/O buffer circuitry to draw power through the core circuitry thus avoiding damage to the electronic devices. It should be understood that, in contrast to certain programmable gate array devices in which implementing timing delays is difficult, the time delays provided by the packaged microcontroller 36 are easy to implement since the packaged microcontroller 36 is capable of simply utilizing built-in timers in order to wait specified amounts of time.

In step 106, the packaged microcontroller 36 configures itself to respond to interrupts and then continues to operate in an event driven manner to maintain robust power signal control for the data storage system 20. In particular, the packaged microcontroller 36 prioritizes a variety of interrupt handling routines which are activated by various interrupts (e.g., a reset routine when the user turns off or resets the data storage system 20, an over-temperature routine if the packaged microcontroller 36 detects that data storage system 20 is overheating, an upgrade routine when the packaged microcontroller 36 detects a command from the user to upgrade code in the memory 56, etc.). Further details of embodiments of the invention will now be provided with reference to FIG. 4.

Figure 4:
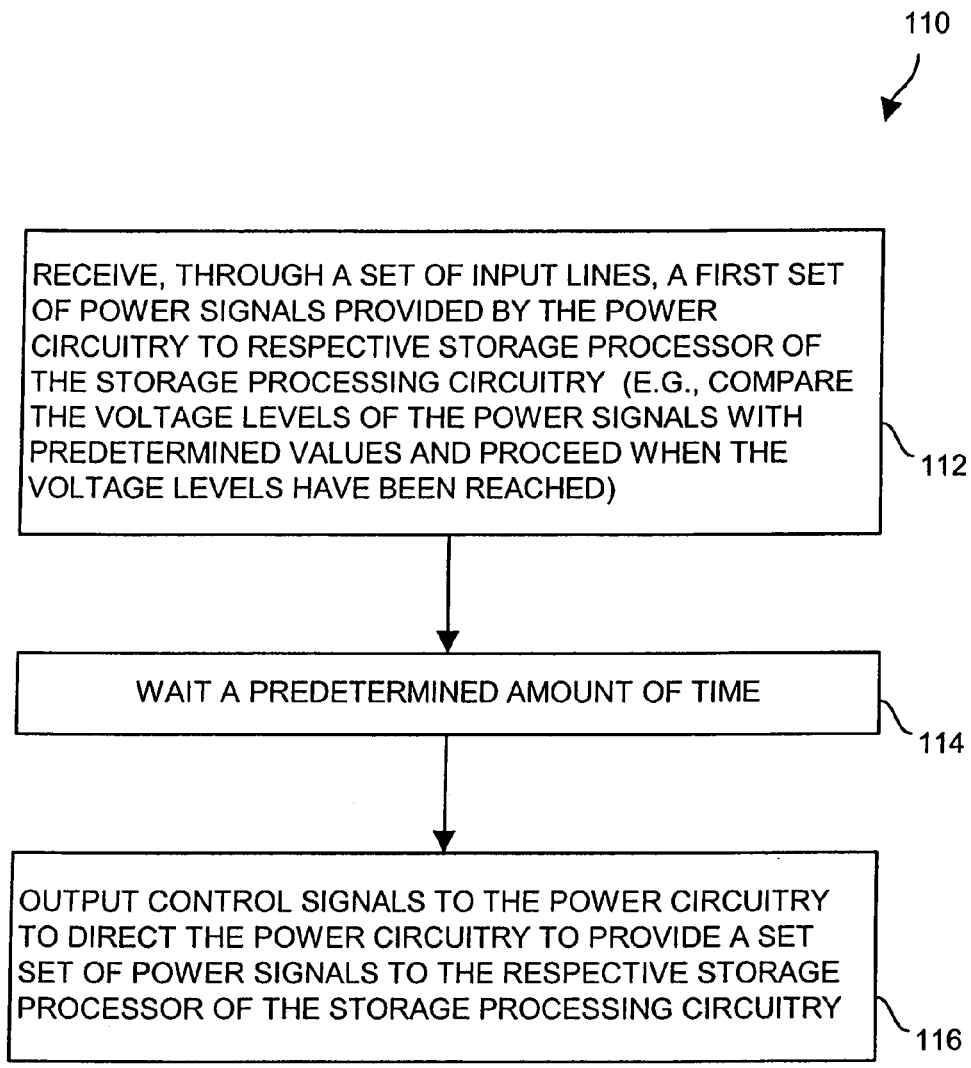
FIG. 4 is a flowchart of a procedure for automatically upgrading code which is run by the packaged microcontroller of FIG. 2.

FIG. 4 shows a power sequencing procedure 110 which is suitable for use as step 104 in FIG. 3. In step 112, the packaged microcontroller 36 receives, on the set of input lines 50, a first set of power signals 40 which is provided by the power circuitry 32 to portions (e.g., the I/O buffers) of its respective storage processor 30 of the storage processing circuitry 24 (e.g., 3.3 VDC, 1.8 VDC, etc.). The packaged microcontroller 36 receives compares the voltage levels of these power signals 40 to predetermined thresholds and proceeds to step 114 only after the power signals 40 have reached these thresholds. The control circuitry 54 is capable of precisely measuring the particular voltage levels of these power signals 40 through the built-in A/D converters 52.

In step 114, the packaged microcontroller 36 waits a predetermined amount of time. This guarantees that the voltage levels of the power signals 40 have stabilized and that its respective storage processor 30 of the storage processing circuitry 24 which receives these power signals 40 (e.g., the I/O circuitry) is properly powered. Step 114 then proceeds to step 116.

In step 116, the packaged microcontroller 36 outputs, through the set of output lines 58, a set of control signals 80 to the power circuitry 32. These control signals 80 (e.g., enable signals) directs the power circuitry 32 to provide a second set of power signals 40 to its respective storage processor 30 of the storage processing circuitry 24 (e.g., 2.5 VDC, 1.25 VDC, etc.). The packaged microcontroller 36 is capable of determining that the second set of power signals 40 is properly provided by sensing through additional built-in A/D converters 52 in a feedback manner. Accordingly, portions of the storage processor 30 of the storage processing circuitry 24 (e.g., the core circuitry) subsequently receives the remaining power signals 40 for robust and reliable operation due to receipt of the power signal 40 in proper sequence. Further details of the invention will now be provided with reference to FIG. 5.

Figure 5:
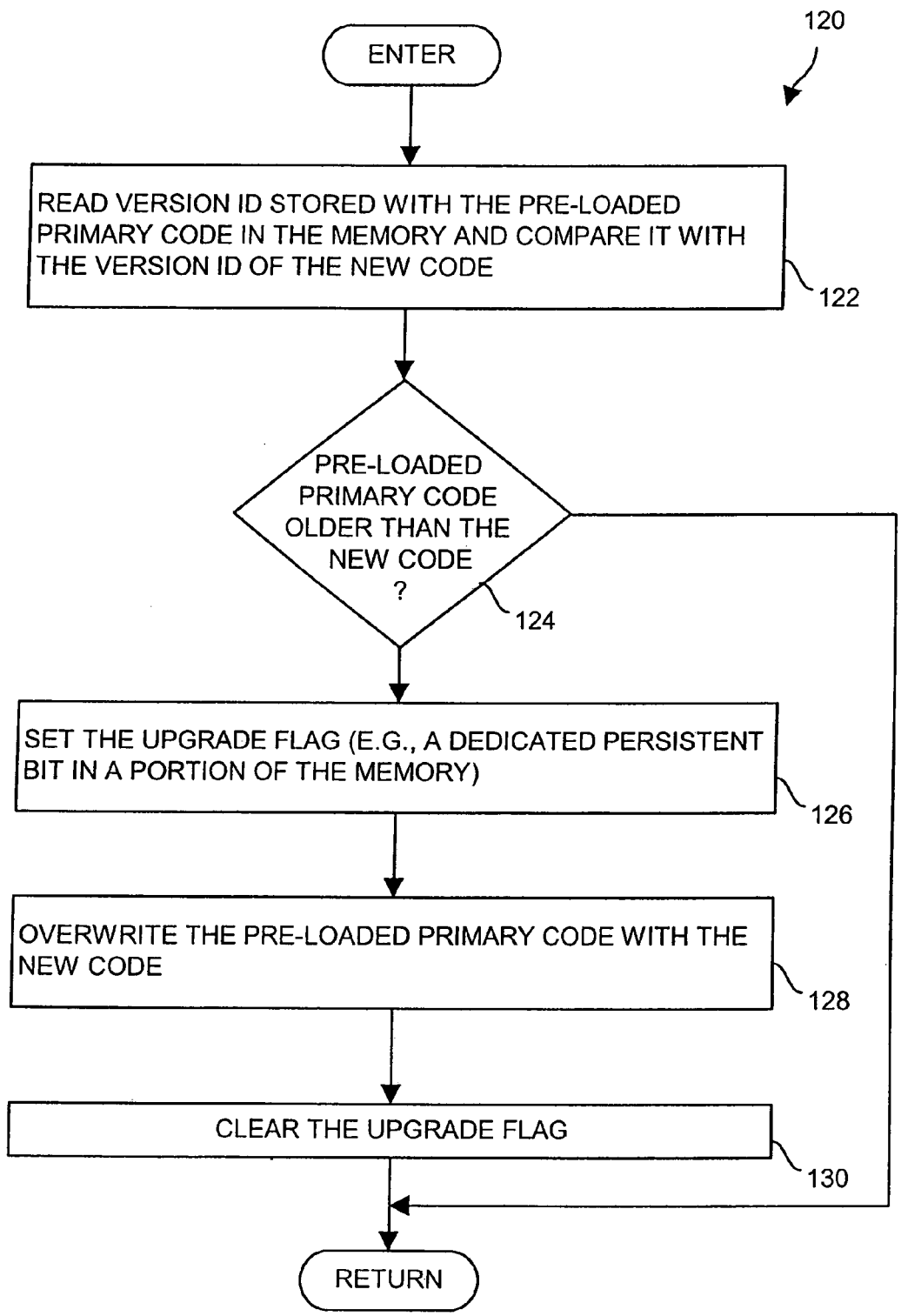
FIG. 5 a flowchart of a procedure for an automated upgrade routine which is suitable for use by an embodiment of the invention.

FIG. 5 shows an automated upgrade routine 120 which is performed by the package microcontroller 36. The package microcontroller 36 runs the automated upgrade routine 120 each time it establishes communication with its respective storage processor 30 through its data port 60(1) (also see FIG. 1). Use of this automated upgrade routine 120 enables the data storage system 20 to use the most recent version of operating code. Accordingly, modifications to the operation of the packaged microcontroller 36 (e.g., a change to the power sequencing procedure, bug fixes, enhancements, etc.) are easily made by simply providing accessibility to the new version of the code. No hardware changes (e.g., replacing components, running an external wire, etc.) are required as in conventional power sequencing circuits implemented with discrete components.

In step 122, the packaged microcontroller 36 reads the version identifier 66 which stored with the pre-loaded primary code 66 stored in the portion 62 of the memory 56 with the version identifier 78 of the available new code 76. The relative values of the version identifiers 66, 78 indicate whether the available new code 76 is more recent than the primary code 66.

In step 124, the packaged microcontroller 36 compares the version identifier 66 with the version identifier 78. If the version identifier 66 indicates that the primary code 66 is at least as new as the available new code 78 (i.e., the version identifier 66 is equal to or more recent that the version identifier 78), the packaged microcontroller 36 skips steps 126 through 130 thus maintaining the pre-loaded primary code 64 within the memory 56. Otherwise, if the version identifier 66 indicates that the primary code 66 is older than the available new code 76, the packaged microcontroller proceeds to step 126.

In step 126, the packaged microcontroller 36 sets a dedicated upgrade flag (i.e., one of the memory locations 74 in the portion 72 of the memory 56, also see FIG. 2) to indicate that the packaged microcontroller 36 is about to perform a code replacement routine to overwrite the primary code 64.

In step 128, the packaged microcontroller 36 replaces the pre-loaded primary code 64 and the version identifier 66 stored in the portion 62 of the memory 54 with the available new code 76 and the version identifier 78.

In step 130, the packaged microcontroller 36 clears the dedicated upgrade flag to indicate that the packaged microcontroller 36 is no longer overwriting the primary code 64, i.e., that the code replacement routine is no longer in progress.

It should be further understood that the packaged microcontroller 36 has built-in safeguards for fault tolerance purposes. For example, prior to attempting to access the primary code 64 in the memory 56 (e.g., when the user turns on the data storage system 20, also see FIG. 3), the packaged microcontroller 36 checks to see whether an upgrade of the primary code 64 was inadvertently terminated before it completed. If an upgrade terminated before completing (e.g., due to loss of power), the upgrade flag in the portion 72 of the memory 56 will still be set when the packaged microcontroller 36 attempts to run the primary code 64. In this situation, the packaged microcontroller 36 runs the boot block code 70 in the memory portion 68 rather than the primary code 64. However, if the upgrade flag is clear, the packaged microcontroller 36 runs the primary code 64 as explained earlier.

Accordingly, the boot block code 70 operates as a backup in case the control circuitry 54 of the packaged microcontroller 36 cannot access the primary code 64. This secondary boot block code 70 is similar to the primary code 64 in that it properly power sequences the power signals 40 to prevent damage to the storage processors 30 of the data storage system 20, but is a simpler version in that it does not include as full or robust a set of operations thus assuming that the data storage system 20 will undergo servicing. Accordingly, the boot block code 70 is essentially code that the packaged microcontroller 36 runs as a failsafe if the packaged microcontroller 36 is unable to read the primary code 64 (e.g., if the primary code 64 is corrupted).

As another example of the fault tolerant operation of the packaged microcontroller 36, it should be understood that the data storage system 20 is capable of utilizing a toggle-style ON/OFF power switch rather than an ON/OFF switch that has a mechanical ON position and a mechanical OFF position. To this end, each packaged microcontroller 36 stores the ON/OFF state of its respective storage processor 30 in a persistent memory location, i.e., an ON/OFF flag in one of the memory locations 74 of the memory portion 72. When the user toggles the ON/OFF power switch to turn on the data storage system 20 (i.e., a power up routine for its respective storage processor 30), the packaged microcontroller 36 updates the memory location by setting its ON/OFF flag to ON. Similarly, when the user toggles the ON/OFF switch to subsequently turn off the data storage system 20 (i.e., a power down routine for its respective storage processor 30), the packaged microcontroller 36 updates that memory location again by setting the ON/OFF flag to OFF.

Accordingly, when the packaged microcontroller 36 receives power, the packaged microcontroller 36 is capable of determining whether the user has toggled the ON/OFF switch, or whether main power has just returned after a loss of main power. In particular, when the packaged microcontroller 36 receives power (as part of step 102 in FIG. 3), the packaged microcontroller 36 reads the ON/OFF flag. If the ON/OFF flag is clear (i.e., the power button was last toggled to the OFF position by the user), the data storage system 20 had been in the OFF state and the user has just toggled the ON/OFF switch to turn on the data storage system 20. As a result, the packaged microcontroller 36 performs the procedure 100 in a normal operating state as described above. However, if the ON/OFF flag is set (i.e., the power button was last toggled to the ON position by the user), the data storage system 20 had been in the ON state and main power has just returned thus enabling the data storage system 20 to enter a recovery state to perform a more extensive diagnostic and/or recovery routine to verify that no data has been lost and that no damage has occurred.

It should be further understood that each packaged microcontroller 36 is capable of coordinating the ON/OFF state of its respective storage processor 30 with other storage processors 30 as well. In particular, when there is more than one storage processor 30 as shown in FIG. 1, each packaged microcontroller 36 communicates with the other packaged microcontrollers 36 through the data port 60(2) (e.g., through UARTs in a peer-to-peer manner) to make sure that its storage processors 30 as well as the other storage processors 30 are in synchronized states. In particular, when the user turns the system ON, if the packaged microcontroller 36 for one storage processor 30 has an ON state and the packaged microcontroller 36 for another storage processor 30 has an OFF state, the packaged microcontroller 36 in the OFF state turns to the ON state in order to synchronize its operation. This operation prevents the storage processors 30 from inadvertently attempting to operate in opposing manners, i.e., avoids one storage processor 30 trying to turn on while another storage processor 30 tries to turn off.

As described above, embodiments of the invention are directed to techniques for controlling a data storage system 20 having (i) a power subsystem 26 for providing power signals 40 and (ii) storage processing circuitry 24 for performing data storage operations, utilizing a packaged microcontroller 36 to control power sequencing. Such use provides power sequencing at a relatively low cost (e.g., less components) and uses a relatively small amount of circuit board real estate (e.g., the footprint of the packaged microcontroller 36). Additionally, such use offers flexibility in that a manufacturer of the data storage system 20 is capable of easily modifying an initial power up sequence by providing new code 76 to the packaged microcontroller 36. Thus, the manufacturer is capable of programming the microcontroller 36 with more robust operations, e.g., automatic upgrading of boot code, utilization of interrupts to respond to particular events, coordination of multiple storage processors, etc.

While this invention has been particularly shown and described with references to preferred embodiments thereof, it will be understood by those skilled in the art that various changes in form and details may be made therein without departing from the spirit and scope of the invention as defined by the appended claims.

For example, it should be understood that the data storage system 20 was described above as having two storage processors 30 by way of example only. In other arrangements, the data storage system 20 has a different number of storage processors 30 (e.g., one, three, four, etc.).

Additionally, it should be understood that the packaged microcontrollers 36 communicated with their respective storage processors 30 through 12C buses by way of example only. Other communications media are suitable for use as well, e.g., GPIO lines, UARTs, other available interfaces, etc.

What is claimed is:

1. A data storage system, comprising:
   power circuitry configured to provide power signals;
   storage processing circuitry configured to perform data storage operations; and
   a packaged microcontroller coupled to the power circuitry and the storage processing circuitry, the packaged microcontroller having a set of input lines, a set of output lines, and control circuitry coupled to the set of input lines and the set of output lines, the control circuitry being configured to:
   receive, on the set of input lines, a first set of power signals which is provided by the power circuitry to the storage processing circuitry,
   wait a predetermined time period in response to receipt of the first set of power signals on the set of input lines, and
   output, through the set of output lines, a set of enable signals to the power circuitry after waiting the predetermined time period, the set of enable signals directing the power circuitry to provide a second set of power signals to the storage processing circuitry;
   wherein the packaged microcontroller further includes:
   a set of built-in analog-to-digital converters coupled to the set of input lines and to the control circuitry, the control circuitry being configured to compare a set of binary values from the set of built-in analog-to-digital converters to a set of pre-determined thresholds to determine when all of the power signals within the set of power signals have reached levels that prevents damage to the storage processing circuitry when the second set of power signals is provided to the storage processing circuitry;
   memory which stores pre-loaded code having a version identifier, the control circuitry being configured to:
   compare the version identifier of the pre-loaded code with a version identifier of available new code, and
   replace the pre-loaded code stored in the memory with the available new code when the version identifier of the available new code indicates that the available new code is newer than the pre-loaded code, and maintain the pre-loaded code within the memory when the version identifier of the available new code indicates that the available new code is not newer than the pre-loaded code.

2. The data storage system of claim 1 wherein the packaged microcontroller further includes:
   a dedicated memory location, wherein the control circuitry, when replacing the pre-loaded code stored in the memory with the available new code, is configured to:
   set the dedicated memory location with a flag to indicate that a code replacement routine is in progress,
   overwrite the pre-loaded code stored in the memory with the available new code, and
   clear the dedicated memory location to remove the flag to indicate that no code replacement routine is in progress.

3. The data storage system of claim 1, further comprising:
   a power button,
   wherein the packaged microcontroller further includes a dedicated memory location, the control circuitry being configured to:
   access the dedicated memory location to determine whether the power button of has been toggled to an "ON" position or an "OFF" position, and
   place the storage processing circuitry in one of (i) a normal operating state when the dedicated memory location indicates that the power button has been toggled to the "ON" position, and (ii) a recovery state when the dedicated memory location indicates that the power button has been toggled to the "OFF" position.

4. A data storage system as in claims 1 wherein the power circuitry includes a variety of power sources, each power source being configured to provide a power signal, which is at a distinct voltage from other power signals provided by other power sources, to an input line of a storage processing circuit of the storage processing circuitry and to an input line of the packaged microcontroller which is separate from the input line of the storage processing circuit.

5. A data storage system as in claim 4 wherein the control circuitry is configured to:
   receive, on the set of input lines, a first set of power signals which is provided by the power circuitry to I/O buffer circuitry of the storage processing circuitry;
   wait a predetermined time period in response to receipt of the first set of power signals on the set of input lines; and
   output, through the set of output lines, a set of enable signals to the power circuitry after waiting the predetermined time period, the set of enable signals directing the power circuitry to provide a second set of power signals, the second set of power signals to power core circuitry of the storage processing circuitry.

6. A data storage system as in claim 5 wherein the packaged microcontroller coupled to the power circuitry and the storage processing circuitry, the packaged microcontroller having a set of input lines, a set of output lines, and control circuitry coupled to the set of input lines and the set of output lines is a PIC-type microcontroller.

7. A packaged microcontroller for controlling a data storage system having (i) power circuitry for providing power signals and (ii) storage processing circuitry for performing data storage operations, the packaged microcontroller comprising:
   a set of input lines;
   a set of output lines;
   control circuitry coupled to the set of input lines and the set of output lines, the control circuitry being configured to:

receive, on the set of input lines, a first set of power signals which is provided by the power circuitry to the storage processing circuitry, wait a predetermined time period in response to receipt of the first set of power signals on the set of input lines; and output, through the set of output lines, a set of enable signals to the power circuitry after waiting the predetermined time period, the set of enable signals directing the power circuitry to provide a second set of power signals to the storage processing circuitry;

a set of built-in analog-to-digital converters coupled to the set of input lines and to the control circuitry, the control circuitry being configured to compare a set of binary values from the set of built-in analog-to-digital converters to a set of pre-determined thresholds to determine when all of the power signals within the set of power signals have reached levels that prevents damage to the storage processing circuitry when the second set of power signals is provided to the storage processing circuitry: and memory which stores pre-loaded code having a version identifier, the control circuitry being configured to:

compare the version identifier of the pre-loaded code with a version identifier of available new code; and replace the pre-loaded code stored in the memory with the available new code when the version identifier of the available new code indicates that the available new code is newer than the pre-loaded code, and maintain the pre-loaded code within the memory when the version identifier of the available new code indicates that the available new code is not newer than the pre-loaded code.

8. The packaged microcontroller of claim 7, further comprising:

a dedicated memory location, wherein the control circuitry, when replacing the pre-loaded code stored in the memory with the available new code, is configured to:

set the dedicated memory location with a flag to indicate that a code replacement routine is in progress, overwrite the pre-loaded code stored in the memory with the available new code, and clear the dedicated memory location to remove the flag to indicate that no code replacement routine is in progress.

9. The packaged microcontroller of claim 7 wherein the data storage system has a power button, and wherein the packaged microcontroller further comprises:

a dedicated memory location, the control circuitry being configured to:

access the dedicated memory location to determine whether the power button of has been toggled to an "ON" position or an "OFF" position, and place the storage processing circuitry in one of (i) a normal operating state when the dedicated memory location indicates that the power button has been toggled to the "ON" position, and (ii) a recovery state when the dedicated memory location indicates that the power button has been toggled to the "OFF" position.

10. The packaged microcontroller of claim 9 wherein the control circuitry is further configured to:

prior to placing the storage processing circuit in one of the normal operating state and the recovery state, communicate with another packaged microcontroller to determine whether other storage processing circuitry of the data storage system is entering a normal operating state or a recovery state.

11. A packaged microcontroller as in claims 7 wherein the control circuitry is configured to:

receive, on the set of input lines, a first set of power signals which is provided by the power circuitry to I/O buffer circuitry of the storage processing circuitry;

wait a predetermined time period in response to receipt of the first set of power signals on the set of input lines; and output, through the set of output lines, a set of enable signals to the power circuitry after waiting the predetermined time period, the set of enable signals directing the power circuitry to provide a second set of power signals, the second set of power signals to power core circuitry of the storage processing circuitry.

12. A packaged microcontroller as in claim 7 wherein the packaged microcontroller coupled to the power circuitry and the storage processing circuitry, the packaged microcontroller having a set of input lines, a set of output lines, and control circuitry coupled to the set of input lines and the set of output lines is a PIC-type microcontroller.

13. A packaged microcontroller for controlling a data storage system having (i) power circuitry for providing power signals and (ii) storage processing circuitry for performing data storage operations, the packaged microcontroller comprising:

a set of input lines;

a set of output lines;

control circuitry coupled to the set of input lines and the set of output lines, the control circuitry being configured to:

receive, on the set of input lines, a first set of power signals which is provided by the power circuitry to the storage processing circuitry, wait a predetermined time period in response to receipt of the first set of power signals on the set of input lines; and output, through the set of output lines, a set of enable signals to the power circuitry after waiting the predetermined time period, the set of enable signals directing the power circuitry to provide a second set of power signals to the storage processing circuitry;

a set of built-in analog-to-digital converters coupled to the set of input lines and to the control circuitry, the control circuitry being configured to compare a set of binary values from the set of built-in analog-to-digital converters to a set of pre-determined thresholds to determine when all of the power signals within the set of power signals have reached levels that prevents damage to the storage processing circuitry when the second set of power signals is provided to the storage processing circuitry;

a dedicated memory location; and memory having a main portion which stores pre-loaded main code and a secondary portion which stores pre-loaded secondary code, wherein the control circuitry is further configured to:

access the dedicated memory location to determine whether a flag is set to indicated that a code replacement routine is in progress, and run (i) the pre-loaded main code stored in the main portion of the memory when the dedicated memory location is not set with the flag, and (ii) the secondary code stored in the secondary portion of the memory when the dedicated memory location is set with the flag.

14. In a packaged microcontroller, a method for controlling a data storage system having (i) power circuitry for providing power signals and (ii) storage processing circuitry for performing data storage operations, the method comprising:
receiving, on a set of input lines of the packaged microcontroller, a first set of power signals which is provided by the power circuitry to the storage processing circuitry;
waiting a predetermined time period in response to receipt of the first set of power signals on the set of input lines; and
outputting, on a set of output lines of the packaged microcontroller, a set of enable signals to the power circuitry after waiting the predetermined time period, the set of enable signals directing the power circuitry to provide a second set of power signals to the storage processing circuitry;
wherein the packaged microcontroller includes:
a set of built-in analog-to-digital converters coupled to the set of input lines, and wherein receiving the first set of power signals includes:
comparing a set of binary values from the set of built-in analog-to-digital converters to a set of pre-determined thresholds to determine when all of the power signals within the set of power signals have reached levels that prevents damage to the storage processing circuitry when the second set of power signals is provided to the storage processing circuitry; and
memory which stores pre-loaded code having a version identifier, and wherein the method further comprises:
comparing the version identifier of the pre-loaded code with a version identifier of available new code; and
replacing the pre-loaded code stored in the memory with the available new code when the version identifier of the available new code indicates that the available new code is newer than the pre-loaded code, and maintaining the pre-loaded code within the memory when the version identifier of the available new code indicates that the available new code is not newer than the pre-loaded code.

15. The method of claim 14 wherein replacing the pre-loaded code stored in the memory with the available new code includes:
setting a dedicated memory location with a flag to indicate that a code replacement routine is in progress;
overwriting the pre-loaded code stored in the memory with the available new code; and
clearing the dedicated memory location to remove the flag to indicate that no code replacement routine is in progress.

16. The method of claim 14 wherein the data storage system has a power button, and wherein the method further comprises:
accessing a dedicated memory location to determine whether the power button of has been toggled to an "ON" position or an "OFF" position; and
placing the storage processing circuitry in one of (i) a normal operating state when the dedicated memory location indicates that the power button has been toggled to the "ON" position, and (ii) a recovery state when the dedicated memory location indicates that the power button has been toggled to the "OFF" position.

17. The method of claim 16, further comprises:
prior to placing the storage processing circuit in one of the normal operating state and the recovery state, communicating with another packaged microcontroller to determine whether other storage processing circuitry of the data storage system is entering a normal operating state or a recovery state.

18. The method of claim 14 wherein:
receiving includes receiving, on the set of input lines, a first set of power signals which is provided by the power circuitry to I/O buffer circuitry of the storage processing circuitry; and
outputting includes outputting, through the set of output lines, a set of enable signals to the power circuitry after waiting the predetermined time period, the set of enable signals directing the power circuitry to provide a second set of power signals, the second set of power signals to power core circuitry of the storage processing circuitry.

19. In a packaged microcontroller, a method for controlling a data storage system having (i) power circuitry for providing power signals and (ii) storage processing circuitry for performing data storage operations, the method comprising:
receiving, on a set of input lines of the packaged microcontroller, a first set of power signals which is provided by the power circuitry to the storage processing circuitry;
waiting a predetermined time period in response to receipt of the first set of power signals on the set of input lines; and
outputting on a set of output lines of the packaged microcontroller, a set of enable signals to the power circuitry after waiting the predetermined time period, the set of enable signals directing the power circuitry to provide a second set of power signals to the storage processing circuitry;
wherein the packaged microcontroller includes:
a set of built-in analog-to-digital converters coupled to the set of input lines, and wherein receiving the first set of power signals includes:
comparing a set of binary values from the set of built-in analog-to-digital converters to a set of pre-determined thresholds to determine when all of the power signals within the set of power signals have reached levels that prevents damage to the storage processing circuitry when the second set of power signals is provided to the storage processing circuitry; and
memory having a main portion which stores pre-loaded main code and a secondary portion which stores pre-loaded secondary code, and wherein the method further comprises:
accessing a dedicated memory location to determine whether a flag is set to indicated that a code replacement routine is in progress; and
running (i) the pre-loaded main code stored in the main portion of the memory when the dedicated memory location is not set with the flag, and (ii) the secondary code stored in the secondary portion of the memory when the dedicated memory location is set with the flag.

* * * * *